Jan. 16, 1968  A. MICHEL  3,364,002
METHOD FOR FLUIDTIGHTLY SECURING A METAL PART
SUCH AS A CONNECTION TO A GLASS MEMBER
Filed May 12, 1964
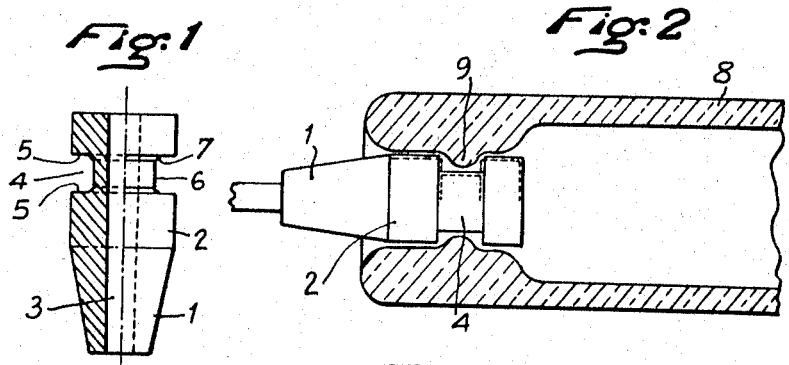
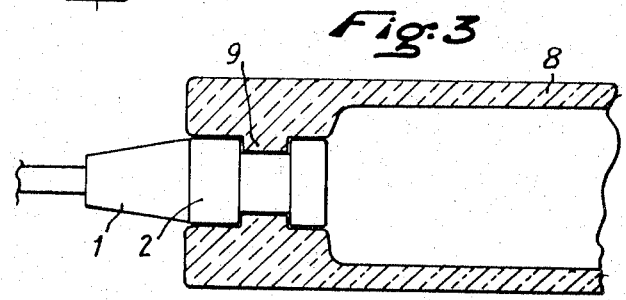
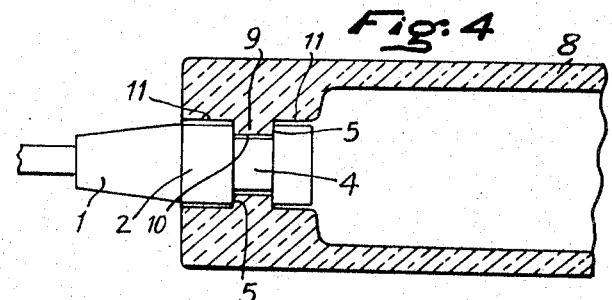
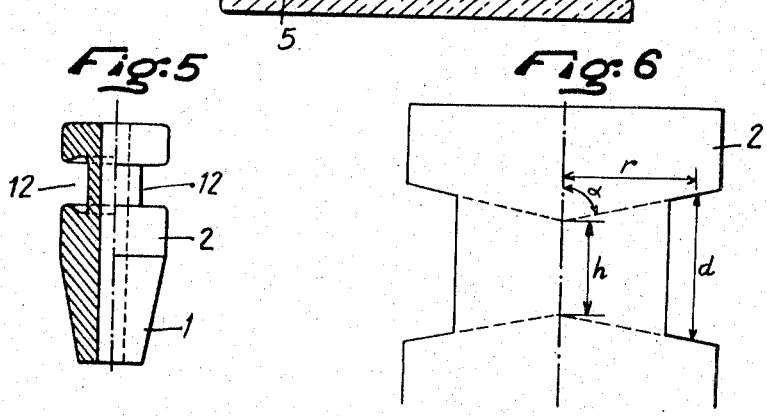
INVENTOR
ALEXIS MICHEL
By Irwin A. Thompson
ATTY.

United States Patent Office 3,364,002
Patented Jan. 16, 1968

3,364,002
METHOD FOR FLUIDTIGHTLY SECURING A METAL PART SUCH AS A CONNECTION TO A GLASS MEMBER
Alexis Michel, Vert-Saint-Denis, France, assignor to Georgette Simone Zejma, Melun, France
Filed May 12, 1964, Ser. No. 366,864
Claims priority, application France, May 14, 1963, 934,799, Patent 1,364,718
4 Claims. (Cl. 65—59)

My invention has for its object means for securing metal parts, chiefly connections, in a glass member. Said securing is obtained generally by embedding the metal part inside the glass which is heated up to its softening point so that during said operation the heated metal part expands and upon subsequent cooling the metal part shrinks. If the shrinking of the metal part predominates over the clamping of the embedding glass produced by the contraction ascribable to the cooling, a clearance appears which leads to the impossibility of obtaining a fluidtight fitting of the metal part in the glass.

In order to solve the problem thus arising, it has been necessary hitherto to resort to metals and alloys which have a coefficient of heat expansion lower than that of the glass to be welded.

However such metals and alloys, even those used with sodo-calcic glasses or ordinary glasses which have a heat expansion coefficient ranging between 90 and $120.10^{-7}$ are expensive and their machining is difficult through conventional methods.

A number of special glasses, which can be welded to tungsten and to molybdenum and the heat expansion coefficients of which are equal to 42 and $49.10^{-7}$ respectively, may be welded with said two metals which show however the same two drawbacks as far as cost price and difficulty of machining are concerned. However, in the case of boro-silicate or neutral glasses such as those sold under the registered trade name Pyrex and the heat expansion coefficients of which are of a magnitude of $32.10^{-7}$, it is impossible to proceed with a direct welding between the glass and the metal and it is necessary to resort not only to special metals or alloys, but also to methods for welding through successive stages with a view to constraining the glass embedding the metal part to assume a condition in which it is liable to be welded to the metal or alloy considered.

It has been attempted to improve the weldability of glasses, chiefly to metal connections, by providing the periphery of metal parts with semi-circular grooves or with triangular threads or ribs, but under the action of contraction upon cooling, it is impossible to prevent the formation of a clearance if the metal is provided with a higher heat expansion coefficient.

My invention has for its object to cut out said drawbacks so as to allow the welding of both sodo-calcic and boro-silicic glasses on metal parts chiefly connections, made of metals or alloys having conventional mechanical and chemical properties such as hard, semi-hard nickel-chromium steel, stainless steel, said parts being machined in accordance with conventional methods say on turret lathes, automatic lathes, boring machines and the like, the welding being performed in a single operative stage upon embedding of the part in the glass.

My improved method consists in executing the metal part to be welded of a metal having a heat expansion coefficient which is larger than that of the glass to which it is to be welded, while the peripheral surface of said part is provided with at least one groove the surfaces of which facing each other include at least one sloping area while the spacing between said surfaces is such that their extensions meet the axis of the metal part before said extensions meet each other. This novel groove according to my invention is undercut or else its lateral surfaces facing each other are parallel or the generating lines of said surfaces lying in a diametrical plane meet each other beyond the axis of the metal part.

It is apparent, generally speaking, that when heating the metal part with a view to welding it, the breadth of the groove between the two lateral surfaces thereof increases. The glass forming a nozzle which is to carry the connection which becomes thicker in a conventional manner forms a bead of glass inside said groove and upon cooling, the two opposite surfaces of the groove clamp between them the glass bead so as to ensure thereby a fluidtight welding.

By reason of the difference in the shrinking upon cooling between the glass and the metal, the clamping of the bead of glass by the lateral surfaces of the groove in the metal part is obtained in a perfect manner in the case of an undercut groove or in the case of a groove having parallel lateral surfaces. However, the same result may be obtained when the acute angle between the two transverse surfaces of the groove remains small, in a manner such that, taking into account the diametrical shrinking of the metal groove which appears at the same time as the axial shortening of the distance between said two surfaces and taking into account also the diametrical and axial shrinking of the glass bead which fills said groove, the clamping after cooling remains sufficient. As a matter of fact, with a heat expansion coefficient which is larger for the metal than for the glass, the clamping after the cooling is sufficient if the generating lines of the groove surfaces meet beyond the axis of the metal part.

My invention has also for its object metal parts, chiefly machined connections, which are treated for welding with glass parts and which are provided with grooves the lateral surfaces of which are undercut or parallel or else meet beyond the axis of the metal part; my invention has also for its object the articles of glass incorporating welded connections provided with such grooves.

My invention will be now described with further detail hereinafter, reference being made to the accompanying drawings wherein:

FIG. 1 is a half elevational, half-sectional view of a nozzle for a glass syringe according to my invention, FIGS. 2 to 4 illustrate diagrammatically on a larger scale, the stages of the welding of a tubular syringe on such a nozzle, FIG. 5 is a sectional view of a nozzle provided with an undercut groove, FIG. 6 illustrates diametrically the principle of the method in the case of a groove having relieved surfaces.

Turning to FIG. 1, the syringe nozzle illustrated includes a frustoconical section 1 over which may be fitted the rear end of the needle and a main section 2 adapted to be fitted in the glass of the syringe. The nozzle is axially bored at 3. According to my invention, the nozzle is provided on the outer surface of its main section with a groove 4 of a rectangular cross-section, that is its two lateral surfaces 5 perpendicular to the axis of the nozzle and facing each other are interconnected by a cylindrical bottom surface 6. To make the machining easier, it is possible to leave a rounded fillet at 7 and possibly to bevel the ridges.

For welding the two parts, that is the nozzle and the syringe glass tube (FIGS. 2 to 4), the nozzle is fitted first into the end of the glass tube 8 and the end of said tube is heated with a blowpipe while air is blown slowly into the tube in a manner such as to prevent the glass from adhering to the metal. The glass is deformed in a conventional manner and forms a bead 9 while the metal of the nozzle of which the original outline is illustrated in dotted lines, expands both radially and longitudinally.

When the bead 9 mates substantially the shape of the expanded main section of the nozzle with only a slight clearance, the blowing of air is cut off and the surfaces of the end of the glass tube engage the periphery of the nozzle. Upon cooling, the metal which has a coefficient of heat expansion which is larger than that of the glass, the diametrical clearances 10 and 11 increase but the slight longitudinal clearance thus formed is compensated by a reduction in the length of the groove 4 and fluidtightness is ensured between the glass bead of which the inner surface is still in a pasty condition and the surfaces 5 of the groove.

The nozzle illustrated in FIG. 5 is identical with that illustrated in FIG. 1 except for the fact that the cross-section of the groove 12 is substantially dovetailed, that is it is undercut. Since the volume of the groove 12 diminishes during the cooling to a greater extent than the volume of glass engaging said groove, an excellent fluidtightness is obtained.

FIG. 6 has for its object to allow examining the mathematic conditions governing the operation so that a clamping is obtained between the lateral surfaces of the groove executed in a cylindrical metal part and the glass.

Assuming $\delta$ designates the heat expansion coefficient of the metal and $\delta_1$ the coefficient of heat expansion of the glass. Considering the points of the groove spaced by a distance $r$ from the axis of the metal part, the distance $d$ between the points of the surfaces of the groove facing each other is equal to $d = h/2r \cos \alpha$, $h$ being the distance separating the points where the generating lines of the surfaces meet the axis of the nozzle and the half angle at the apex of the conical surface on which said surfaces are formed. For a temperature $t$, said two values are given out by:

$$r_t = r(1+\delta t) \text{ and } d_t = (h+2r \cos \alpha)(1+\delta t)$$

Assuming that the bead of glass fills the expanded groove, the glass points which are in contact with the points considered on the groove surfaces lie after cooling at a point distant from the axis by a radius equal to $$r_v = \frac{r(1+\delta t)}{(1+\delta_1 t)}$$

while the distance $d_v$ is equal to:

$$d_v = \frac{(h+2r \cos \alpha)(1+\delta t)}{(1+\delta_1 t)}$$

but after cooling, said points of the glass face points of the groove surfaces the radius of which is equal to $r_v$ while their distance $d_m$ is equal to $h/+2rv \cos \alpha$ that is $$h + 2\frac{r(1+\delta t)}{1+\delta_1 t}$$

In order to obtain a clamping of the glass by the transverse surfaces of the groove, it is necessary for $d_v \geq d_m$ or $$\frac{(h+2r \cos \alpha)(1+\delta t)}{1+\delta_1 t} h + 2\frac{r(1+\delta t)}{1+\delta_1 t} \cos \alpha$$

to wit=

$$(h+2r \cos \alpha)(1+\delta t) \geq h(1+\delta_1 t) + 2r(1+\delta t) \cos \alpha$$

this means $$h\delta t \geq h\delta_1 t$$

Now $\delta$ being larger than $\delta_1$, it is consequently necessary and sufficient for $h$ to be positive, that is for the generating lines of said transverse surfaces to meet beyond the axis of said metal part. If $h$ is negative, which is the case for grooves having a triangular cross-section, it is necessary for $\delta_1 \geq \delta$, in other words, the coefficient of heat expansion of the metal should be lower than that of the glass.

The embodiments described hereinabove are given by way of a mere exemplification and may be subjected to many modifications without widening the scope of the invention, as defined in the accompanying claims.

What I claim is:

1. A method for fluidtightly securing a metal part in an opening formed in a glass member the coefficient of heat expansion of which is lower than that of the metal part, said method consisting in forming in said metal part at least an annular groove the lateral surfaces of said groove having areas being so spaced and having such a slope that their extensions meet the axis of the metal part before meeting each other, introducing the grooved part of said metal part in the opening of the glass member, heating transiently the metal part and glass member to fuse the glass and form a glass bead penetrating in said groove and allowing them to cool.

2. A method according to claim 1 in which said annular groove has a right-angled section.

3. A method according to claim 1 in which said annular groove is undercut.

4. A method according to claim 1 in which said annular groove has a trapezoidal section, the extensions of the lateral surfaces of the groove meeting the axis of the groove before meeting each other.

References Cited

UNITED STATES PATENTS

| | | | |
|---|---|---|---|
| 2,546,002 | 3/1951 | Jelinek | 65—105 |
| 2,562,752 | 7/1951 | Torgenson | 65—59 |
| 2,959,170 | 11/1960 | Laub | 128—218 |

DONALL H. SYLVESTER, *Primary Examiner.*

S. LEON BASORE, *Examiner.*

R. L. LINDSAY, R. E. MORGAN, *Assistant Examiners.*